United States Patent [19]

Chang et al.

[11] 4,430,486

[45] Feb. 7, 1984

[54] FILM-FORMING URETHANE RESINS CONTAINING ALKOXY SILANE GROUPS AND ACRYLYL GROUPS

[75] Inventors: Wen-Hsuan Chang; Robert Piccirilli; Walter F. Kasper, all of Gibsonia, Pa.

[73] Assignee: PPG Industries, Inc., Pittsburgh, Pa.

[21] Appl. No.: 445,315

[22] Filed: Nov. 29, 1982

[51] Int. Cl.$^3$ .............................................. C08F 283/00
[52] U.S. Cl. ....................................... 525/44; 525/453
[58] Field of Search ................................ 525/453, 440

[56] References Cited

U.S. PATENT DOCUMENTS

| | | | |
|---|---|---|---|
| 3,170,891 | 2/1965 | Speier | 260/37 |
| 3,632,557 | 1/1972 | Brode et al. | 260/77.5 TB |
| 3,963,771 | 7/1976 | Robson et al. | 260/482 R |
| 3,979,344 | 9/1976 | Bryant et al. | 260/18 TN |
| 4,067,844 | 1/1978 | Barron et al. | 260/37 N |
| 4,122,074 | 10/1978 | Pepe et al. | 526/26 |
| 4,130,708 | 12/1978 | Friedlander et al. | 528/28 |
| 4,146,585 | 3/1979 | Ward et al. | 260/827 |
| 4,147,679 | 4/1979 | Scriven et al. | 260/29.2 TN |
| 4,222,925 | 9/1980 | Bryant et al. | 260/37 N |
| 4,345,053 | 8/1982 | Rizk et al. | 525/440 |

OTHER PUBLICATIONS

Dow Corning-New Product Information 531 Fluid.

*Primary Examiner*—Melvyn I. Marquis
*Attorney, Agent, or Firm*—Linda Pingitore; Charles R. Wilson

[57] ABSTRACT

Ungelled reaction products of a urethane resin having acrylyl groups with an amino silane are formed. The products are capable of curing at a low temperature to form durable coatings. Polyols can optionally be blended with the ungelled reaction products to provide useful coating compositions.

18 Claims, No Drawings

FILM-FORMING URETHANE RESINS CONTAINING ALKOXY SILANE GROUPS AND ACRYLYL GROUPS

BACKGROUND OF THE INVENTION

The subject invention relates to film-forming resins capable of low-temperature cure. More particularly, the invention relates to film-forming resins capable of curing through alkoxy silane groups and coating compositions containing the film-forming resin and, optionally, polyols.

In recent years, the coatings industry has become increasingly interested in low-temperature cure coating compositions. These compositions must be capable of being applied by conventional techniques such as spraying, dipping, roll-coating, brushing, etc., yet be capable of curing at a low temperature, ideally room temperature. Obviously, the primary advantage of these compositions is the lessened energy demands.

The coatings industry has also become interested in low organic solvent-containing coating compositions. Such compositions must also be capable of application by conventional techniques. These coating compositions present several advantages including high film build per application, economy of materials, especially organic solvents which are lost to ambient surroundings, lessened concerns about pollution problems caused by the evaporation of organic solvents and also energy savings since less air needs to be heated to evaporate the solvents in a curing oven. Additionally, the organic solvents themselves have been in short supply.

Much work has been expended in the coatings industry to formulate coating compositions which contain a low organic solvent content. One area in particular which has received attention has been in the formulation of water-based coating compositions. Water is itself, of course, quite inexpensive and does not pose environmental problems. However, film-forming resins which are capable of being reduced with water are themselves normally water-sensitive and do not provide a film having all the desired characteristics, such as humidity resistance and durability. Still another area of coating technology which has received attention in recent years is the formulation of high solids coating compositions which are of a low viscosity and can be applied by conventional techniques. Such coating compositions can contain what is referred to as reactive diluents. These reactants are capable of thinning the coating composition and then reacting with the film-forming resins after application to a substrate. In effect, the diluent becomes a part of the cured film.

Additionally, there have been formulated coating compositions which are capable of curing at a low temperature and which are low in organic solvent content. However, the known compositions all have one or more drawbacks associated with them. Thus, for example, coating compositions based on alkyd resins are slow to cure to a durable film and the cured film often does not have particularly good properties. One pack and two pack isocyanate-containing coating compositions suffer from health concerns associated with the isocyanate. Epoxy and amine-containing coating compositions have the disadvantage of having to be a two pack system and the resultant films are less durable than often desired.

One class of film-forming resins which has been extensively used because of its good film properties has been the high molecular weight thermoplastic urethane resins. Compositions made from these resins provide good films and are capable of curing at ambient conditions. One drawback they have is that compositions containing the resins require a high solvent content to give them a viscosity suitable for coating purposes. Another class of film-forming resins with good film properties are those thermoset urethane polyol resins which are mixed with a melamine cross-linking agent. However, a drawback of this system is that a high cure temperature is needed. There have now been found urethane resins which are capable of forming a film at low temperature and, when formulated in a coating composition, high levels of organic solvents are not needed to achieve application viscosity. Compositions containing the film-forming resins of this invention can be applied to a substrate to form a durable film. Components such as polyols and cross-linking agents can be blended with the new film-forming resins to provide additional coating characteristics.

As used herein, all percents and ratios are by weight unless otherwise indicated.

SUMMARY OF THE INVENTION

Film-forming resins capable of curing at a low temperature are derived from the reaction of (a) a urethane resin having an average of greater than 1 amine reactive acrylyl residues per molecule and a free isocyanate content of up to about 15 percent with (b) an amino silane of formula

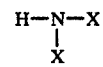

where X is independently (1) hydrogen, (2) an alkyl, aryl, or cycloalkyl group having from 1 to 10 carbon atoms, or (3)

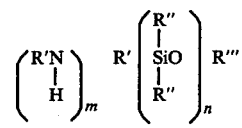

where R' is independently an alkylene group having from 2 to 10 carbon atoms, m is from 0 to 2, R" is independently a hydrogen, alkyl, aryl, cycloalkyl, alkoxy, or acryloxy group having from 1 to 8 carbon atoms, n is from 1 to 5 and R''' is an alkyl group having from 1 to 8 carbon atoms, with the proviso at least one X is a radical containing silicon. The reaction product has an acrylyl content of from about 0.2 to about 2 milliequivalents per gram.

The reaction product described above is useful as a major film-forming component in a coating composition or it can be blended with a polyol or polyepoxide resin to further modify film properties. The coating compositions can be cured at low temperatures and can contain a low organic solvent content.

DETAILED DESCRIPTION OF THE INVENTION

This invention relates to film-forming resins having alkoxy silane groups and coating compositions containing the film-forming resin. The novel film-forming resins, as well as coating compositions containing the resins, are described in the following paragraphs.

The reaction products of this invention are characterized as being ungelled and having an acrylyl content of from about 0.2 to about 2 milliequivalents (meq.) per gram. The ungelled products of the invention are formed from the reaction of a urethane resin and an aminosilane. The urethane resin has an average of greater than 1 amine reactive acrylyl residues per molecule and a free isocyanate content of up to about 15 percent. The amine reactive acrylyl residues as used herein includes the moiety

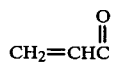

as well as alkyl substituted acrylyl residues such as

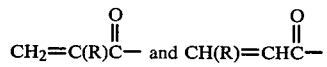

where R is a lower alkyl group having up to 4 carbon atoms. Preferred urethane resin reactants have an average of greater than about 1.2, more preferred greater than about 1.5, amine reactive acrylyl residues per molecule. The preferred free isocyanate content of the urethane resin reactant is from about 0.5 percent to about 15 percent, while the more preferred range is from about 0.5 percent to about 5 percent.

Typical ungelled reaction products have a silicon content (in the form of alkoxy silane groups) of from about 0.5 percent to about 12 percent. A preferred acrylyl content ranges from about 0.2 to about 1.0 meq. per gram. The more preferred reaction products of the invention have a silicon content of from about 1 percent to about 5 percent and an acrylyl content of from about 0.2 to about 0.8 meq. per gram.

Urethane resin reactants are derived from the reaction of a polyisocyanate with a hydroxyl- and acrylyl-containing compound such as hydroxyl-containing acrylyl compounds, acrylates, methacrylates, crotonates, ethacrylates and acrylamides. Several different polyisocyanates are useful. Examples include aliphatic, cycloaliphatic or aromatic compounds having two or more isocyanate groups. Illustrative compounds are 1,4-tetramethylene diisocyanate; 1,6-hexamethylene diisocyanate; 2,2,4-trimethyl 1,6-hexane diisocyanate; 1,10-decamethylene diisocyanate; 1,4-cyclohexylene diisocyanate; 4,4'-methylene bis(cyclohexane isocyanate); p-phenylene diisocyanate; isophorone diisocyanate; 4,4'-bisphenylene diisocyanate; 4,4'-methylene bis(diphenyl isocyanate); 1,5-naphthalene diisocyanate; and 1,5-tetrahydronapthalene diisocyanate. Examples of hydroxyl-containing compounds reacted with the isocyanate include 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 6-hydroxyhexyl acrylate, 6-hydroxyhexyl ethacrylate, 3-hydroxypropyl crotonate, 2-acrylylethanol, 2-acrylylpropanol, 3-hydroxypropyl acrylamide and any of the aforedescribed compounds which has been modified by reaction with a lactone. The hydroxyl-containing acrylates and methacrylates are highly preferred. Amounts of the hydroxyl- and acrylyl-containing compounds and isocyanate reactants which are reacted together are adjusted to obtain the above stated free isocyanate contents. A polyol reactant can also be included in the reaction if desired.

Additional urethane reactants are made by (1) reacting a polyol with stoichiometrically deficient amounts of an acrylic or methacrylic acid and then (2) further reacting the product with an isocyanate. A urethane reactant with free isocyanate groups can be obtained by using a polyisocyanate in the second stage of the reaction.

Urethane prepolymers can also be used to obtain the desired urethane resin reactant. For example, urethane resin reactants are derived from the reaction of a polyurethane having free isocyanate groups with a hydroxyl- and acrylyl-containing material as above described. Also, a polyurethane having free hydroxyl groups reacted first with a monoethylenically unsaturated carboxylic acid and then with an isocyanate compound will result in the desired urethane resin reactant. A still additional urethane resin reactant is made by reacting a polyurethane resin having free hydroxyl groups with an isocyanato-containing acrylate. If the ultimate urethane resin reactant is to have free isocyanate groups, such groups should be included on the resin which is reacted with the isocyanato-containing acrylate.

Polyisocyanates useful for making the urethane prepolymers are those described in the preceding paragraph. Polyhydric materials for reacting with the polyisocyanates include the aliphatic diols such as ethylene glycol, 1,2-propane diol, 1,3-propane diol, 2,2,4-trimethyl-1,3-pentane diol, 2,2-dimethyl-1,3-propane diol, 1,2-butane diol, 1,4-butane diol, 1,3-butane diol, 1,5-pentane diol, and 1,10-decane diol; dimethylolpropionic acid; 2,2-dimethyl-3-hydroxypropyl 2,2-dimethyl-3-hydroxypropionate; ester diols formed from one mole of a diol and one mole of a lactone, e.g., butyrolactone or caprolactone; diols containing a cyclic structure such as 1,4-cyclohexane-dimethanol, p-xylylene glycol, bisphenol A, hydrogenated bisphenol A, and 1,4-cyclohexane diol; triols such as glycerol, trimethylol ethane, trimethylol propane, and 1,2,6-hexane triol; tetraols such as pentaerythritol; polyester polyols such as derived from the reaction of a dicarboxylic acid with a polyhydric material; ether polyols such as diethylene glycol, dipropylene glycol, dibutylene glycol, reaction products of a polyhydric material as described above or water with a monoepoxide such as butyl glycidyl ether, octyl glycidyl ether, allyl glycidyl ether, phenyl glycidyl ether, 1,2-butylene oxide, and styrene oxide; and polyether polyols such as those of structural formula

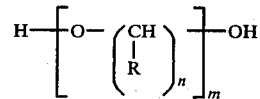

where R is hydrogen or lower alkyl containing from 1 to 5 atoms, n is from 2 to 6 and m is from 3 to 20, e.g., poly(oxytetramethylene)glycols, poly(oxyethylene)-glycols and poly(oxy-1,2-propylene)glycols, and reaction products formed by oxyalkylation of various polyols such as ethylene glycol, 1,6-hexanediol, bisphenol A, trimethylolpropane, pentaerythritol, sorbitol, and sucrose. The reaction ratio of the reactants is adjusted depending on whether the urethane prepolymer is to have free hydroxyl, free isocyanate or free hydroxyl and free isocyanate groups present.

Examples of the monoethlenically unsaturated carboxylic acid useful for reacting with the polyurethane having free hydroxyl groups include acrylic acid, methacrylic acid (with both being preferred), crotonic acid and ethacrylic acid.

The above urethane resins which form the backbone of the reaction products of this invention are further reacted with an amino silane so as to result in a product having pendent alkoxy silane groups and acrylyl residues. Several different amino silanes are known and are useful herein. The amino silane has the formula $$H-N-X$$
$$\phantom{H-N-}|$$
$$\phantom{H-N-}X$$

where X is independently (1) hydrogen, (2) an alkyl, aryl, or cycloalkyl group having from 1 to 10 carbon atoms or (3)

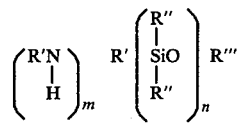

wherein R' is independently an alkylene group having from 2 to 10 carbon atoms, m is from 0 to 2, R" is independently a hydrogen, alkyl, aryl, cycloalkyl, alkoxy, or aryloxy group having from 1 to 8 carbon atoms, n is from 1 to 5 and R'" is an alkyl group having from 1 to 8 carbon atoms, with the proviso at least one X is a radical containing silicon. Preferred amino silanes are those having the formula

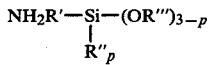

with R', R", and R'" as defined above and p is from 0 to 2. Especially preferred amino silanes are those where p is 0 and R' is an alkylene linkage having from 2 to 5 carbon atoms. Examples of materials are aminomethyltriethyoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxysilane, N-beta(aminoethyl)gammaaminopropyltrimethoxysilane, delta-aminobutyltriethoxysilane, delta-aminobutylethyldiethoxysilane. Preferred aminosilanes are gamma-aminopropyltrimethoxysilane and gamma-aminopropyltriethoxysilane.

The aforedescribed reactants are readily reacted simply by blending them at room temperature or at a slightly elevated temperature, for example, up to about 100° C. The reaction is carried out in the absence of a solvent or in the presence of an inert solvent. Any inert solvent can be used that does not interfere with the reaction. Examples of suitable inert solvents are toluene, butyl acetate, and ethylene glycol monoethyl ether acetate. It is highly preferred that the reaction be conducted in the absence of moisture or a controlled amount of moisture to avoid unwanted side reactions and possibly gellation.

The ratio of the reactants in the above reaction will have an effect on the molecular weight of the reaction products of this invention. The Flory equation is used as a guide to predicting the molecular weight of the ungelled reaction products. The reaction of primary amino groups with di- or polyfunctional acrylates can be viewed as a condensation polymerization in which the primary amino group of the amino silane is difunctional with respect to the acrylyl residue on the condensation product. This is demonstrated by the equation below:

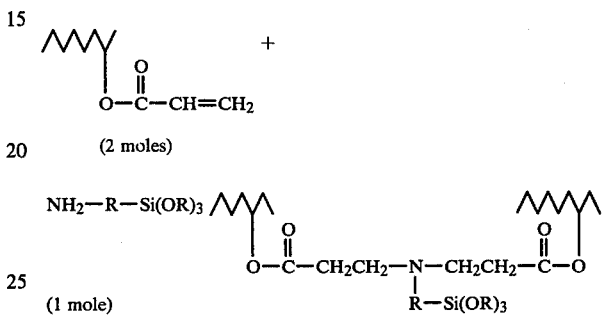

In preparing the ungelled products of the present invention, the Flory equation as modified by Stockmayer can be used as a guide. The equation for calculating the weight average molecular weight ($M_w$) is as follows:

$$\overline{M_w} = \frac{P_B \frac{\Sigma M_i^2 A_i}{\Sigma f_i A_i} + P_A \frac{\Sigma M_j^2 B_j}{\Sigma g_j B_j} + P_A P_A \frac{P_A(f_e - 1)M_B^2 + P_B(g_e - 1)M_A^2 + 2M_A M_B}{1 - P_A P_B(f_e - 1)(g_e - 1)}}{P_B \frac{\Sigma M_i A_i}{\Sigma f_i A_i} + P_A \frac{\Sigma M_j B_j}{\Sigma g_j B_j}}$$

where $A_i$=moles of $i^{th}$ acrylyl compound with functionality $f_b$; $B_j$=moles of $j^{th}$ amino silane with functionality $g_b$; $M_i$=molecular weight of $i^{th}$ acrylyl compound; $M_j$=molecular weight $j^{th}$ amino silane; $P_B$=fraction of amino hydrogens reacted, $P_A$=fraction of acrylyl groups reacted, $M_A$, $M$, $f_e$ and $g_e$ defined as follows:

$$f_e = \frac{\Sigma f_i^2 A_i}{\Sigma f_i A_i} \qquad g_e = \frac{eg_i^2 B_j}{eg_i B_j}$$

$$M_A = \frac{\Sigma M_i f_i A_i}{\Sigma f_i A_i} \qquad M_B = \frac{\Sigma M_j R_j B_j}{\Sigma g_j B_j}$$

For a detailed study of the theory and principles underlying the above equations, reference is made to Official Digest, January 1964, pages 28–41.

The Stockmayer equation enables one to predict whether a reaction mixture will gel. The equation takes into consideration the total moles and functionality of the amino silane and acrylyl residue. This is true only if the acrylyl groups are the only amine reactive groups in the reaction mixture. However, if isocyanate groups are present, it must be understood the amino groups will react first with the isocyanate groups thus decreasing the moles of amine available for reaction with acrylyl groups. Thus, in using the Stockmayer equation the effective amount of amine groups is that which is remaining after reaction with isocyanate groups. The equation enables one to calculate, based on the amount of acrylate consumed, the weight average molecular weight at a degree of reaction ($P_A$). Thus, the Stockmayer equation can be used as a guide in the practice of the present invention.

This equation accurately gives the molecular weight of products depending on the ratio of amine groups to acrylyl residues assuming these reactant groups are equally reactive and no side reactions can take place. However, this is normally not the case. For example, a small amount of water can result in siloxane formation of the amino silane to give the structure indicated below. Such a diamine would be tetrafunctional

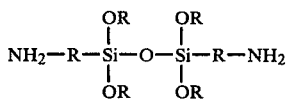

relative to acrylyl residues and would lead to branching and premature gellation not predicted by the Stockmayer equation as expressed above. Also, acrylate polymerization can occur to a small extent leading to higher molecular weight products not predicted by the Stockmayer equation as expressed above. Reactions can also occur between alkoxy silane groups and alcohols thus changing the course of the polymerization. As a result the Stockmayer equation can be used only as a rough guide and the final ratio of reactants must be determined empirically.

Sufficient amounts of the amino-silane are used to insure that the ungelled reaction product has the desired acrylyl content. One advantage of having the stated acrylyl content is that the final product will contain less amine groups in the backbone (from the amino silane) and thus be more durable with better humidity and acid resistance. It should be noted that when the urethane resin reactant contains free isocyanate, its subsequent reaction with the amino silane results in urea linkages being formed from the isocyanate and amino groups. The resins of this invention which have the urea linkages form films which have excellent gloss retention. In fact, it has been found that the higher the urea content, the greater the gloss retention. Also, the presence of the urea linkages in the resins improves the resistance of films made from the resins to dirt and mildew pick-up.

If one desires to incorporate less silane functionality pendant to the backbone, a non-silane functional amine such as butyl amine can be used. Thus, the number of crosslinking groups for a given molecular weight can be lowered to achieve softer, more flexible coatings.

The ungelled reaction products of this invention are useful for application to a substrate, per se. The ungelled reaction products in one embodiment of the invention are blended with a low level of a conventional organic solvent so as to decrease the viscosity of the composition. Levels of organic solvent as low as 5 percent can be used and still result in a coating composition capable of application by conventional coating techniques. Typically, the coating compositions consist essentially of from about 30 percent to about 95 percent, preferably from about 40 percent to about 90 percent, of the ungelled reaction product and the balance organic solvent. The applied coating in this embodiment is cured to a durable film by a moisture cure mechanism. Thus, moisture found in the atmosphere hydrolyzes the alkoxy silane groups of the ungelled reaction products to silanol groups which are capable of linking with other silanol groups to eventually form a cross-linked polymeric network through formation of siloxane linkages.

Ungelled reaction products described above can also be blended with known polyols to result in coating compositions which form films which are even more durable and resistant. Generally, coating compositions of this type contain, on a film-forming solids basis, from about 10 percent to about 90 percent, preferably from about 40 percent to about 90 percent, of the ungelled reaction product and from about 10 percent to about 90 percent, preferably from about 10 percent to about 30 percent, of the polyol. The curing mechanism of such compositions primarily involves reaction of the alkoxy silane groups from the ungelled reaction products of the invention with the hydroxyl groups of the polyol to form a cross-linked durable film.

Polyols described above with respect to the formation of an acrylate can be used with the ungelled reaction products. Other suitable polyols are described in U.S. Pat. No. 3,959,201, "High Solids, Water Thinnable Compositions", Chang, in columns 4-8 (the disclosure of which is hereby incorporated by reference). Polyols described therein include polyester polyols, amine group-containing polyols, polyurethane polyols, cyclic nitrogen-containing polyols, polyurea polyols, and hydroxyl-containing acrylates.

Other film-forming resins can be included in the compositions of this invention to modify or provide desired attributes to a cured coating. For example, polyepoxide resins or conventional crosslinking agents such as aminoplast resins can be included in the polyol-containing compositions.

Coating compositions containing the ungelled reaction products and the organic solvent and/or water will optionally also contain pigments, fillers, plasticizers, anti-oxidants, flow control agents, surfactants and other conventional additives. Catalysts, in particular, are included in the compositions at a level ranging from about 0.1 percent to about 5 percent based on the ungelled reaction product and polyol. Conventional catalysts such as the tin naphthanate, tin benzoate, tin dioctoate, tin butyrate, dibutyltin dilaurate, iron stearate, and tetraisopropyl titanate are used.

The compositions herein can be applied by conventional coating methods, including brushing, dipping, flow coating, roll coating and spraying. Virtually any substrate, including wood, metals, glass and plastics can be coated with the compositions. Cure of the applied compositions can be effected by moisture (with or without heat) as described above or with a polyol as described below. Those instances where a low temperature cure is desired are most amenable to using the compositions of this invention. Thus, ambient temperature is sufficient for effecting a cure provided a cure period of up to two days can be tolerated prior to achieving a coating having its essentially fully developed properties. A more fully developed cure in the coating can be achieved by applying heat, with up to about 150° C. being sufficient, and preferably up to about 50° C. being sufficient. The applied compositions can also be UV cured by radiation due to the presence of the acrylyl groups.

EXAMPLE I

The ungelled reaction product of this example is based on the reaction of (1) a urethane resin derived from a hydroxyethyl acrylate/caprolactone adduct, dimethyolpropionic acid and a diisocyanate with (2) an amino silane.

Initially, a reaction vessel is charged with 3929.2 parts epsiloncaprolactone, 3799.6 parts hydroxyethyl acrylate (HEA), 7.0 parts Tinuvin P (available from Ciba Geigy Corp.), 3 parts methyl quinone inhibitor and 8.0 parts stannous octoate catalyst. The molar ratio of e-caprolactone to HEA is 1:1. The mixture is heated to 120° C. and maintained there for about 5 hours. An analysis by infrared spectroscopy shows no caprolactone present.

Another reaction vessel is next charged with 2618.8 parts of the above caprolactone/HEA adduct, 170.2 parts dimethyolpropionic acid and 2150.8 parts of 4,4'-methylene bis(cyclohexane isocyanate). The mixture is heated to 100° C., at which point it exotherms to 155° C. The mixture is next cooled to 90° C. and maintained there for about 1 hour. An analysis of a sample showed it to be a urethane resin having a free isocyanate content of 2.15 percent.

The ungelled reaction product of this invention is made by charging a reaction vessel with 1263 parts of gamma-aminopropyltriethoxysilane and slowly adding, with cooling, 4000 parts of the urethane resin. The temperature exotherms to 95° C. After about 40 minutes, an IR analysis of a sample shows no free isocyanate. The viscosity of the mixture is next reduced by adding 2843 parts of anhydrous ethanol.

The resultant ungelled reaction product has an acrylyl content weight of 0.348 meq./g. and a silicon content of 3.0 percent.

EXAMPLE II

Following the procedure of Example I, a series of ungelled reaction products is made wherein (1) varying proportions of HEA and e-caprolactone are used to form an acrylate- and hydroxyl-containing reactant, (2) varying proportions of HEA/e-caprolactone, dimethyolpropionic acid (DMPA) and 4,4'-methylene bis(-cyclohexane isocyanate) reactants are used to produce urethane resins having different free isocyanate contents and (3) varying proportions of urethane resins and amino silanes are used to form ungelled reaction products having different acrylyl contents and silicon contents. The following table puts in a summary form the aforementioned variations with ungelled reaction product A representing the product made in Example I.

TABLE I

| Ungelled Reaction Product | Molar Ratio of HEA/ e-Capro- lactone | Free Isocyanate Content of Urethane Resin Reactant (%) | DMPA Content of Product (%) | Acrylyl Content Weight (meq./g) | Silicon Content of Product (%) |
|---|---|---|---|---|---|
| A | 1:1 | 2.2 | 2.6 | 0.348 | 3.0 |
| B | 1:1 | 2.1 | 2.9 | 0.329 | 1.0 |
| C | 1:1 | 2.1 | 2.9 | 0.334 | 1.6 |
| D | 1:1 | 2.0 | 2.7 | 0.343 | 2.5 |
| E | 1:1 | 2.3 | 0 | 0.637 | 3.0 |
| F | 1:1 | 4.2 | 2.8 | 0.704 | 3.3 |
| G | 1:1 | 2.8 | 2.7 | 0.462 | 3.1 |
| H | 1:1 | 1.7 | 2.6 | 0.261 | 3.0 |
| I | 1:1 | 1.5 | 2.5 | 0.218 | 3.0 |
| J | 1:3 | 1.2 | 1.9 | 0.248 | 2.2 |
| K | 1:2 | 1.3 | 2.2 | 0.289 | 2.5 |
| L | 1:2 | 3.1 | 1.9 | 0.491 | 3.0 |

The above ungelled reaction products are formulated separately in coating compositions as the sole film-former (Formulation A) or together with a polyol (Formulation B). Formulations A and B are as follows:

Formulation A

|  | % |
|---|---|
| Ungelled reaction product | 52.3 |
| Dibutyltin dilaurate | 0.4 |
| Aluminum pigment | 1.5 |
| Acetone | 13.8 |
| Ethylene glycol monoethyl ether acetate | 2.3 |
| Isopropanol | 4.6 |
| Toluene | 9.1 |
| Xylene | 6.9 |
| Aliphatic naphtha | 9.1 |

Formulation B

|  | % |
|---|---|
| Ungelled reaction product | 92.4 |
| Hydrogenated Bisphenol A diglycidyl ether | 6.0 |
| Stannous octoate | 1.6 |

The ungelled reaction products identified above as Ungelled Reaction Products A-I are evaluated in either Formulation A or Formulation B as set out in Table II. The evaluations are done on spray applied films which are cured at room temperature (Ungelled Reaction Products A, F-I) or films formed from a 3 mil drawdown bar (Ungelled Reaction Products B-E) cured at room temperature.

TABLE II

| Ungelled Reaction Product | For- mula- tion | Tack- Free Time (Hrs.) | Pencil Hard- ness | Gasoline Soak Resis- tance (after 6 days) | Methyl Ethyl Ketone Resis- tance* (after 4 days) | % Gloss Reten- tion/ Dirt and Mildew Resis- tance** |
|---|---|---|---|---|---|---|
| A | A | 4 | F | Exc. | — | 18.5/good |
| B | B | 14 | — | — | 40 | — |
| C | B | — | — | — | 64 | — |
| D | B | — | — | — | 100 | — |
| E | B | 14 | — | — | 90 | — |
| F | A | 4 | HB | Exc. | — | 30.3/exc. |
| G | A | 3 | F | Exc. | — | 22.4/good |
| H | A | 3 | F | Exc. | — | 19.6/fair |
| I | A | 3 | F | Exc. | — | 15.8/fair |

*As determined by the number of double rubs with a cloth soaked with methyl ethyl ketone which are needed to break through the film.
**Percent gloss retention and dirt and mildew resistance of the films are measured after test panels have been exposed to one year of Florida exposure (facing south). The % gloss retention is determined by dividing the gloss of the film after one year exposure by the initial gloss of the film, with both glosses being measured by a Gardner Instruments Glossmeter. The dirt and mildew resistance of the films is determined by a visual observation and rating system ranging from excellent for no noticeable mildew or permanent dirt pick-up to poor for a very mildewed and dirty film.

The above results show that coating compositions based on ungelled reaction products A, F, G, H, and I dry to a tack-free state at low cure temperature and time, yet exhibit good film properties as measured by the film's good hardness and gasoline resistance or methyl ethyl ketone resistance.

EXAMPLE III

This example illustrates the making of an ungelled reaction product using isophorone diisocyanate (IPDI) as a reactant in the urethane resin.

Following the procedure of Example I, a reaction vessel is initially charged with 509.1 parts of the HEA/e-caprolactone adduct of Example I, 33.1 parts DMPA and 354.3 parts IPDI. The mixture is heated to 80° C., at which point the mixture exotherms to 103° C. With the help of a cold water jacket the mixture is maintained at 85°–92° C. for about 2½ hours. The percent free isocyanate content of the product is analyzed to be 1.6.

The mixture next has added to it, at room temperature, 303.3 parts of gamma-aminopropyltriethoxysilane. The temperature of the mixture exotherms to 64° C. After about 3 hours, an analysis of a sample shows there to be no free isocyanate present, an acrylyl content of 0.364 meq. per gram and a silicon content of 3.1 percent.

Use of the ungelled reaction product in Formulation A of Example II gives a coating composition which can be coated on a substrate and cured at room temperature to give a coating which is tack-free after 2 hours. The film has a pencil hardness of F and has excellent gasoline soak resistance after 6 days.

What is claimed is:

1. An ungelled reaction product characterized in having an acrylyl content of from about 0.2 to about 2 meq. per gram is derived from the reaction of:
   (a) a urethane resin having an average of greater than 1 amine reactive acrylyl residue per molecule and a free isocyanate content of up to about 15 percent; and
   (b) an amino silane of formula

where X is independently (1) hydrogen, (2) an alkyl, aryl, or cycloalkyl group having from 1 to 10 carbon atoms, or (3)

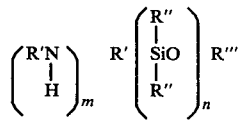

where R' is independently an alkylene group having from 2 to 10 carbon atoms, m is from 0 to 2, R'' is independently a hydrogen, alkyl, aryl, cycloalkyl, alkoxy, or aryloxy group having from 1 to 8 carbon atoms, n is from 1 to 5 and R''' is an alkyl group having from 1 to 8 carbon atoms, with the proviso at least one X is a ra;ical containing silicon.

2. The reaction product of claim 1 wherein the product has an acrylyl content of from about 0.2 to about 1.0 meq. per gram.

3. The reaction product of claim 2 wherein the reaction product has a silicon content of from about 0.5 percent to about 12 percent.

4. The reaction product of claim 3 where the product has an acrylyl content of from about 0.2 to about 0.8 meq. per gram and a silicon content of from about 1 percent to about 5 percent.

5. The reaction product of claim 4 wherein the urethane resin has an average of greater than about 1.2 amine reactive acrylyl residues per molecule.

6. The reaction product of claim 5 wherein the urethane resin has an average of greater than about 1.5 amine reactive acrylyl residues per molecule.

7. The reaction product of claim 5 wherein the urethane resin has a free isocyanate content of from about 0.5 percent to about 15 percent.

8. The reaction product of claim 7 wherein the urethane resin has a free isocyanate content of from about 0.5 percent to about 5 percent.

9. The reaction product of claim 8 wherein the urethane resin is derived from the reaction of a diisocyanate, hydroxyalkyl acrylate or methacrylate and a lactone.

10. The reaction product of claim 7 wherein the amino silane has the formula

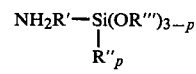

where p is from 0 to 2.

11. The reaction product of claim 10 wherein p is 0.

12. The reaction product of claim 11 wherein the amino silane has as R' an alkylene linkage of from 2 to 5 carbon atoms and R''' is a methyl or ethyl group.

13. The reaction product of claim 12 wherein the amino silane is gamma-aminopropyltriethoxysilane, gamma-aminopropyltrimethoxysilane, or a mixture thereof.

14. The reaction product of claim 1 further characterized in being capable of curing at a temperature of less than about 150° C.

15. A coating composition consisting essentially of (a) from about 30 percent to about 95 percent of the reaction product of claim 1, and (b) the balance an inert organic solvent.

16. The coating composition of claim 15 additionally consisting essentially of a polyol as a reactant.

17. The coating composition of claim 16 wherein the product of claim 1 represents, on a film-forming solids basis, from about 10 percent to about 90 percent of the composition and the polyol from about 10 percent to about 90 percent of the composition.

18. The coating composition of claim 15 further characterized in being capable of curing at a temperature less than about 150° C.

* * * * *

UNITED STATES PATENT AND TRADEMARK OFFICE
CERTIFICATE OF CORRECTION

PATENT NO. : 4430486

DATED : February 7, 1984

INVENTOR(S) : Wen-Hsuan Chang; Robert Piccirilli; Walter F. Kasper

It is certified that error appears in the above-identified patent and that said Letters Patent is hereby corrected as shown below:

In Claim 1, column 11, line 54, "ra;ical" should read "radical".

Signed and Sealed this

Eighteenth Day of December 1984

[SEAL]

Attest:

GERALD J. MOSSINGHOFF

Attesting Officer     Commissioner of Patents and Trademarks